United States Patent [19]

Tsushima et al.

[11] Patent Number: 5,572,960
[45] Date of Patent: Nov. 12, 1996

[54] TWO-CYCLE ENGINE OF THE SPARK IGNITION TYPE

[75] Inventors: Yuji Tsushima; Takaharu Kurosaki; Kenjiro Saito; Yoichi Ishibasi, all of Saitama, Japan

[73] Assignee: Honda Giken Kogyo Kabushiki Kaisha, Tokyo, Japan

[21] Appl. No.: 359,291

[22] Filed: Dec. 19, 1994

[51] Int. Cl.⁶ ............................................. F01N 3/28
[52] U.S. Cl. .................... 123/65 PE; 123/73 A
[58] Field of Search ................ 123/65 PE, 65 V, 123/65 P, 65 R, 73 A

[56] References Cited

U.S. PATENT DOCUMENTS

| | | | |
|---|---|---|---|
| 4,213,431 | 7/1980 | Onishi | 123/73 R |
| 4,920,932 | 5/1990 | Schlunke | 123/65 PE |
| 4,938,178 | 7/1990 | Schlunke et al. | 123/65 PE |
| 4,993,373 | 2/1991 | Klomp et al. | 123/65 PE |
| 5,063,887 | 11/1991 | Ozawa et al. | 123/65 PE |
| 5,190,006 | 3/1993 | Motoyama et al. | 123/65 PE |
| 5,337,707 | 8/1994 | Blundell et al. | 123/65 PE |
| 5,341,775 | 8/1994 | Yamauchi | 123/65 PE |
| 5,373,816 | 12/1994 | Asai et al. | 123/65 PE |

FOREIGN PATENT DOCUMENTS

| | | |
|---|---|---|
| 287038A2 | 10/1988 | European Pat. Off. . |
| 636776A1 | 2/1995 | European Pat. Off. . |
| 2548086 | 5/1977 | Germany . |
| 2805519 | 8/1978 | Germany . |
| 2851504 | 6/1980 | Germany . |
| 3516951 | 9/1986 | Germany . |
| 3638711 | 11/1987 | Germany . |
| 8611580 | 1/1988 | Germany . |
| 53-109007 | 9/1978 | Japan . |
| 61-004819 | 1/1986 | Japan . |
| 5-187488 | 7/1993 | Japan . |
| 2175643A | 12/1986 | United Kingdom . |

OTHER PUBLICATIONS

Patent Abstracts of Japan, vol. 002, No. 138 (M–040) JP53109007, Masaaki et al. Sep. 1978.

*Primary Examiner*—David A. Okonsky
*Attorney, Agent, or Firm*—Birch, Stewart, Kolasch & Birch, LLP

[57] ABSTRACT

A two-cycle engine of the spark ignition type is provided wherein a mixture in a combustion chamber can be compressed and self-ignited at least in a low load operation region to effect an activated heat atmosphere combustion. In a transition operation region between the activated heat atmosphere combustion region and an ordinary spark ignition combustion operation region, the mixture can be ignited by a spark ignition at a timing earlier than the spark ignition timing in the ordinary spark ignition combustion operation region to stabilize the combustion condition and eliminate abnormal combustion noise and the harmful effects of heat. A throttle valve opening of a throttle valve manually operated is detected by a throttle valve opening sensor formed from a potentiometer or the like while an engine speed is detected by an engine speed sensor, and they are inputted to a CPU. The CPU operates in accordance with a control graph of FIG. 5 which defines an exhaust air passage opening ratio in response to the engine speed Ne and the throttle valve opening, and transmits to an exhaust control servomotor a drive signal at which the exhaust air passage opening ratio based on the graph is provided. An ignition plug 22 generates, in an ordinary combustion operation region, a spark at 10° (crank angle) prior to the top dead center. When it is discriminated by the CPU that the engine is operating in a transition operation region A between the ordinary combustion operation region and an AR combustion operation region, a spark is generated at 20° prior to the top dead center in response to a control signal of the CPU.

18 Claims, 8 Drawing Sheets

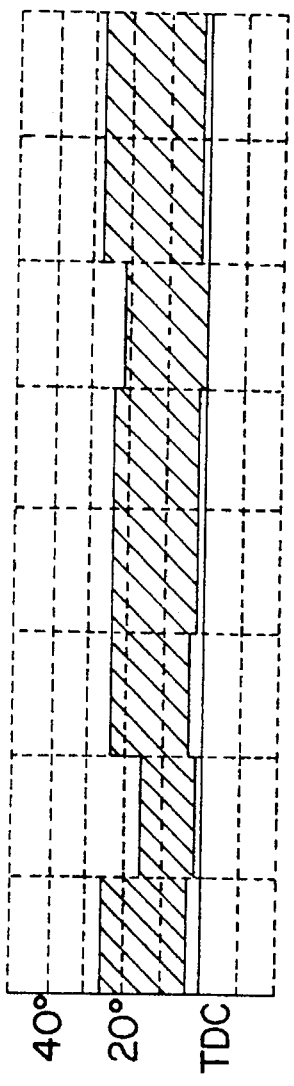
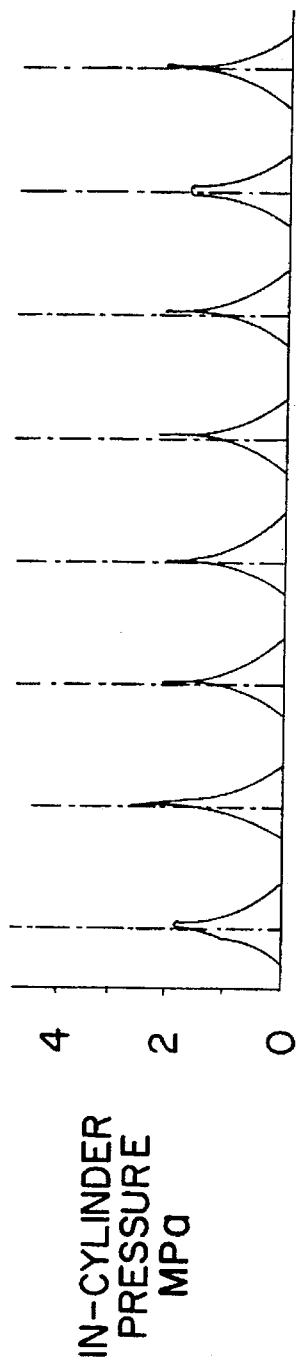
FIG. 7A  COMBUSTION TIMING
FIG. 7B  PRESSURE VARIATION RATIO dp/dθ Bar/deg
FIG. 7C  IN-CYLINDER PRESSURE MPa

COMBUSTION TIMING

PRESSURE VARIATION RATIO dp/dθ Bar/deg

IN-CYLINDER PRESSURE MPa

TWO-CYCLE ENGINE OF THE SPARK IGNITION TYPE

BACKGROUND OF THE INVENTION

1. Field of the Invention

This invention relates to a two-cycle engine of the spark ignition type, in which a mixture in a combustion chamber can be compressed and self-ignited at least in a low load operation region to effect activated heat atmosphere combustion. The mixture in the combustion chamber can be ignited, in a transition operation region between the activated heat atmosphere operation region and an ordinary spark ignition combustion operation region, by spark ignition at a timing earlier than the spark ignition timing in the ordinary spark ignition combustion operation region to stabilize the combustion condition to eliminate abnormal combustion noise or harmful effects of heat.

2. Description of Background Art

In a two-cycle engine of the spark ignition type having a carburetor, fresh air is obtained and mixed with fuel with air in advance being supplied into a combustion chamber. An exhaust port and a scavenging port which are opened and closed by a piston are formed on an inner circumferential face of a cylinder bore. The mixture, pressurized in a crank chamber in advance, is supplied into a cylinder chamber through the scavenging port while burnt gas in the cylinder chamber is exhausted through the exhaust port, and the mixture compressed in the cylinder chamber is ignited by means of an ignition plug.

In such a conventional two-cycle engine of the spark ignition type as described above, if the exhaust port is made large in order to set the output power and the efficiency in a high speed, high load operation region to a level higher than a high level, then, in a low load operation region, the amount of unburnt hydrocarbons in the exhaust gas is increased by blow-by of fresh air or unstable combustion, resulting in deterioration of the fuel cost.

In order to eliminate the above problems, the present inventor has developed and applied for a patent for an engine wherein an exhaust control valve such as an exhaust air passage opening ratio adjustment means is actuated to an exhaust air passage opening ratio in response to the engine speed and the throttle valve opening to control the in-cylinder pressure when the exhaust opening is closed by the piston appropriately at least in a low load operation region so that the mixture in a combustion chamber can be activated by heat energy of burnt gas remaining in the combustion chamber to cause the mixture in the combustion chamber to be compressed and self-ignited at an ignition timing preferable for operation of the engine (Japanese Patent Application No. Heisei 5-187488).

The combustion wherein the ignition timing preferable for operation of an engine is controlled positively to cause activated heat atmosphere combustion to take place in this manner is hereinafter referred to as AR combustion, and the operation region in which such AR combustion takes place will be hereinafter referred to as AR operation region.

In such a two-cycle engine of the spark ignition type in which AR combustion can take place as described above, an ignition plug generates a spark at a predetermined ignition timing in whatever operation condition of the engine. Since the amount of fresh air taken in is small in an AR combustion operation which makes use of heat energy of burnt gas as shown in FIG. 6, when the engine speed Ne rpm) is higher than a very low speed, the output power is low compared with that in an ordinary combustion operation wherein ignition firing takes place, but in a transition operation region A between the ordinary combustion operation region and the AR combustion operation region, ordinary combustion and AR combustion take place in a mixed manner.

In the AR combustion operation region, if the exhaust air passage opening ratio is set appropriately in response to the comparatively low engine speed and the comparatively small throttle valve opening by way of the exhaust control valve, then compression self-ignition in which the ignition timing is stabilized takes place without being influenced by the spark ignition timing by the ignition plug. However, in the transition operation region A in which ordinary combustion and AR combustion take place in a mixed condition as described above, in a certain cycle, fresh air activated by heat energy of burnt gas is ignited by compression self-ignition at an early timing to cause a sudden combustion reaction so that, as shown in FIGS. 8B and 8C, a great pressure variation and a high indicator pressure are provided. In a next cycle, the ignition timing is delayed by a drop in expansion end temperature due to the early ignition, and a small pressure variation and a low indicator pressure are provided. Such phenomena take place alternately, and the ignition timing is not stabilized and high exhaust noise is produced.

As set forth in Japanese Patent Laid-Open Application No. Showa 53-109007, an operation method for a spark ignition engine includes a cylinder which is normally operated with spark ignition and operated upon a particular operation such that both of an intake air flow and an exhaust air flow or only the exhaust air flow is restricted so as to effect operation with compression ignition, and upon transition to the compression ignition operation, said cylinder is operated with spark ignition at a compulsorily advanced ignition timing. This operation takes place as if the ignition timing was advanced in a transition operation region between an ordinary combustion operation region and an AR combustion operation region within a single cylinder. However, since, upon transition to the compression self-ignition operation (different from the AR combustion operation) in which the compression self-ignition timing is not controlled, the exhaust air flow is restricted so as to effect a compression self-ignition operation with one of two cylinders while only the ignition timing is advanced without restricting the exhaust air flow with the other cylinder, combustion is started prior to the top dead center to cause an excessively earlier ignition condition. Consequently, occurrence of harmful effects of heat or abnormal combustion noise is invited.

OBJECTS AND SUMMARY OF THE INVENTION

The present invention relates to improvements in a two-cycle engine of the spark ignition type which has overcome the disadvantages described above and provides a two-cycle engine of the spark ignition type wherein a mixture obtained by mixing fuel into air in advance is supplied into a combustion chamber and the mixture in the combustion chamber can be compressed and self-ignited at least in a low load operation condition to effect an activated heat atmosphere combustion, wherein an exhaust air passage opening ratio adjustment means is provided for adjusting an opening ratio of an exhaust air passage to control a compression starting in-cylinder pressure, ignition timing adjustment means for adjusting an ignition timing, and control means for driving the exhaust air passage opening adjustment means to an exhaust air passage opening ratio corresponding at least to an engine speed and a throttle valve opening to control the compression starting in-cylinder pressure to a predetermined compression starting in-cylinder pressure with which the mixture in the combustion engine can be compressed and self-ignited at an ignition timing in a preferred operation of the engine and for operating the ignition timing adjustment means in a predetermined transition operation region B between the activated heat atmosphere combustion operation region AR and a predetermined ordinary spark ignition combustion operation region C to cause spark ignition to occur at a timing earlier than a spark ignition timing in the predetermined ordinary spark ignition combustion operation region to control a combustion starting timing by the spark ignition to a timing in the proximity of the top dead center. See FIG. 6.

Since the present invention is constructed in such a manner as described above, in the transition operation region between the AR combustion operation region and the ordinary combustion operation region C, spark ignition by the ignition plug can be caused to take place at a timing earlier than the spark ignition timing in the ordinary spark ignition combustion operation region C to ignite the mixture in the combustion chamber without depending upon compression self-ignition. Consequently, the combustion condition can be made substantially fixed in any cycle, and the exhaust noise can be held at a low level and harmful effects of heat can be eliminated.

The present invention can exhibit a superior effect particularly with a two-cycle engine of the spark ignition type wherein the ignition delay period is long due to a strong pulsation disturbance in an exhaust air passage in which exhaust air passage opening ratio adjustment means includes a butterfly valve.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7A is a characteristic diagram illustrating the condition according to the combustion timing in the embodiment of the present invention;

FIG. 7B is a characteristic diagram illustrating the in-cylinder pressure variation ratio in the embodiment of the present invention;

FIG. 7C is a characteristic diagram illustrating the in-cylinder pressure in the embodiment of the present invention;

DETAILED DESCRIPTION OF THE PREFERRED EMBODIMENTS

Figure 1:
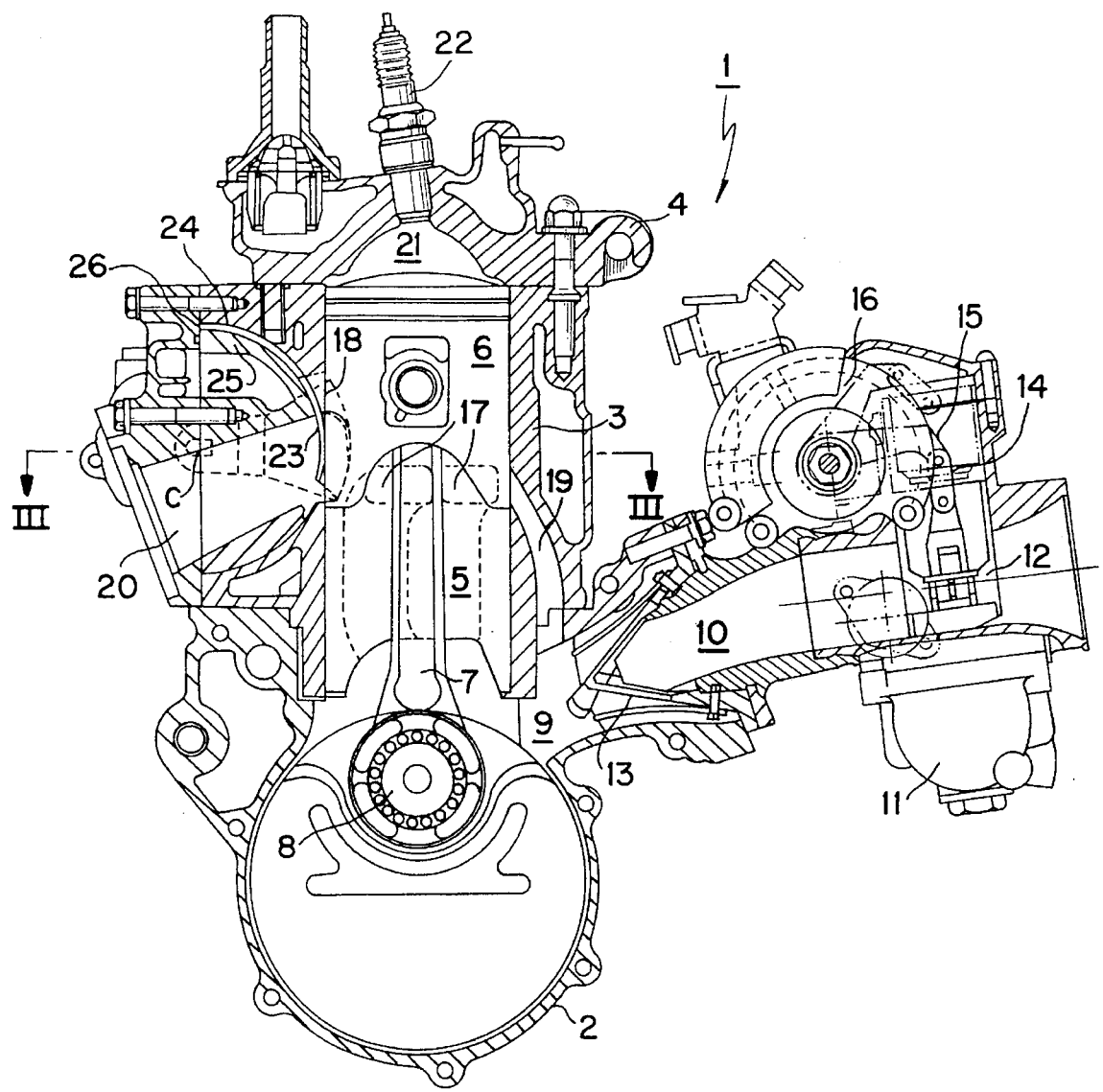
FIG. 1 is a vertical sectional side elevational view showing, in vertical section, a cylinder portion of a two-cycle engine of the spark ignition type which includes a combustion control apparatus of the present invention.

An embodiment of the present invention shown in FIGS. 1 to 4 includes a two-cycle engine 1 of the spark ignition type which includes a throttle valve control apparatus which may be mounted on a motorcycle not shown, and in the two-cycle engine 1 of the spark ignition type, a cylinder block 3 and a cylinder head 4 are successively placed one on the other above a crank case 2 and integrally coupled to each other.

Meanwhile, a piston 6 is fitted for upward and downward sliding movement in a cylinder aperture 5 formed in the cylinder block 3. The piston 6 and a crank 8 are connected to each other by a connecting rod 7 so that the crank 8 is driven to rotate by upward and downward movement of the piston 6.

Further, an intake air passage 10 is connected to a crank chamber 9 in the crank case 2, and a carburetor 11 and a reed valve 13 are interposed in series in the intake air passage 10. A throttle valve 12 of the piston type of the carburetor 11 is connected to a throttle drum 16 by way of a rod 14 and a lever 15. The throttle drum 16 is connected to a throttle grip by way of a wire, not shown, so that when the throttle grip is twisted in one direction, the throttle valve 12 is raised to increase the throttle valve opening.

Furthermore, the intake air passage 10 is connected to the crank chamber 9 of the crank case 2, and scavenging ports 17 and an exhaust port 18 are opened to an inner periphery of the cylinder hole 5. The scavenging ports 17 are connected to the crank chamber 9 by way of scavenging air passages 19 while the exhaust port 18 is communicated with an exhaust air passage 20.

Meanwhile, an ignition plug 22 is provided in a recessed portion of the combustion chamber 21 above the cylinder hole 5, and fresh air mixed with fuel supplied from the carburetor 11 is sucked into the crank chamber 9, which has been put into a negative pressure condition upon an upward stroke, by way of the reed valve 13 and is compressed upon a downward stroke. When the piston 6 moves down from the scavenging ports 17 to open the scavenging ports 17, the compressed mixture is supplied into the combustion chamber 21. As a result of the admission of the compressed mixture, part of combusted gas in the combustion chamber 21 is exhausted into the exhaust air passage 20 by way of the exhaust port 18. When the scavenging ports 17 and then the exhaust port 18 are closed as a result of upward movement of the piston 6, the air fuel mixture in the combustion chamber 21 is compressed upon the upward movement of the piston 6, and in the proximity of the top dead center, ignition by means of an ignition plug 22 or self-ignition by heat energy of the remaining gas of the last cycle takes place.

Figure 2:
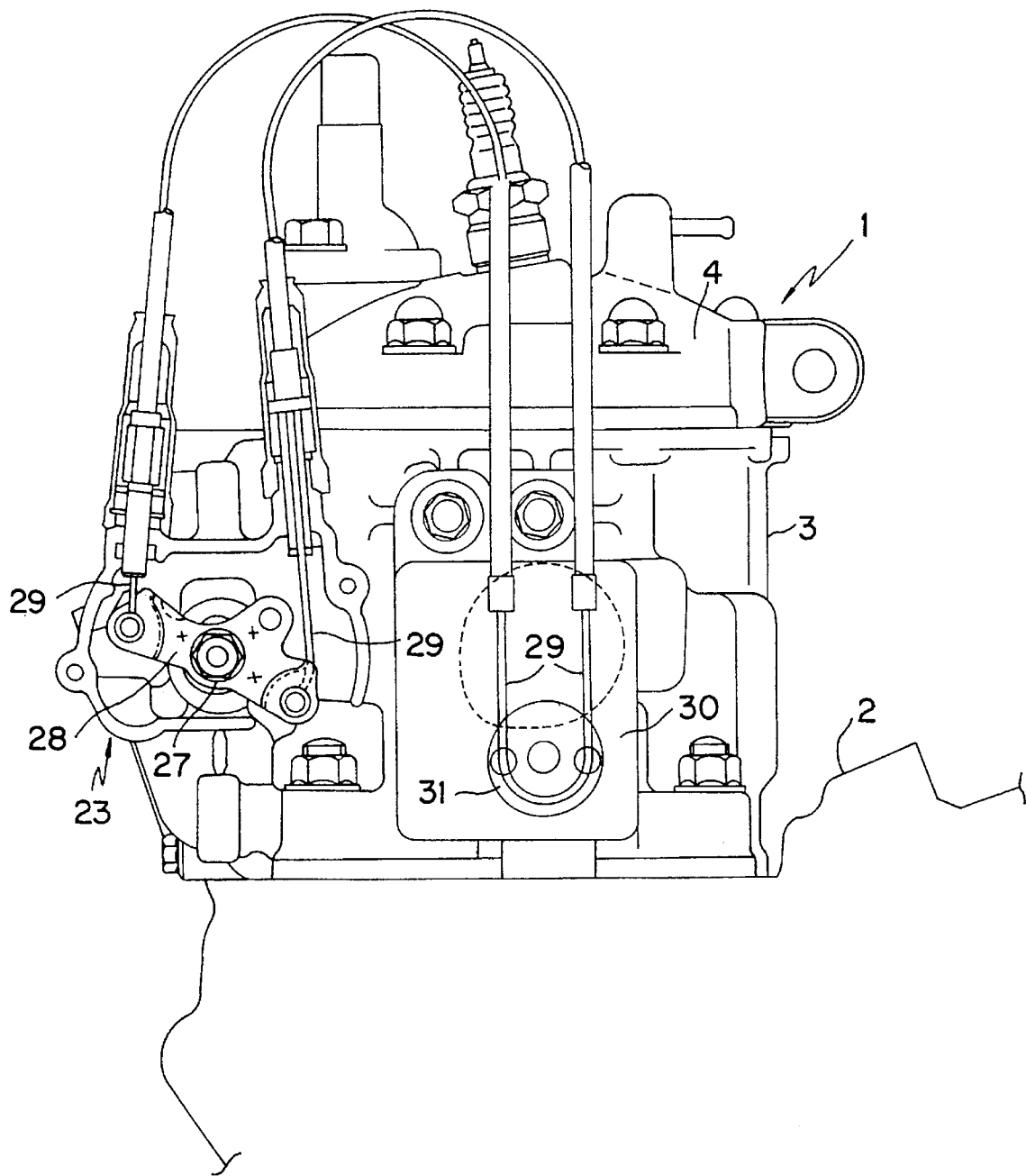
FIG. 2 is a side elevational view of the cylinder portion showing the same side face as in FIG. 1.
Figure 3:
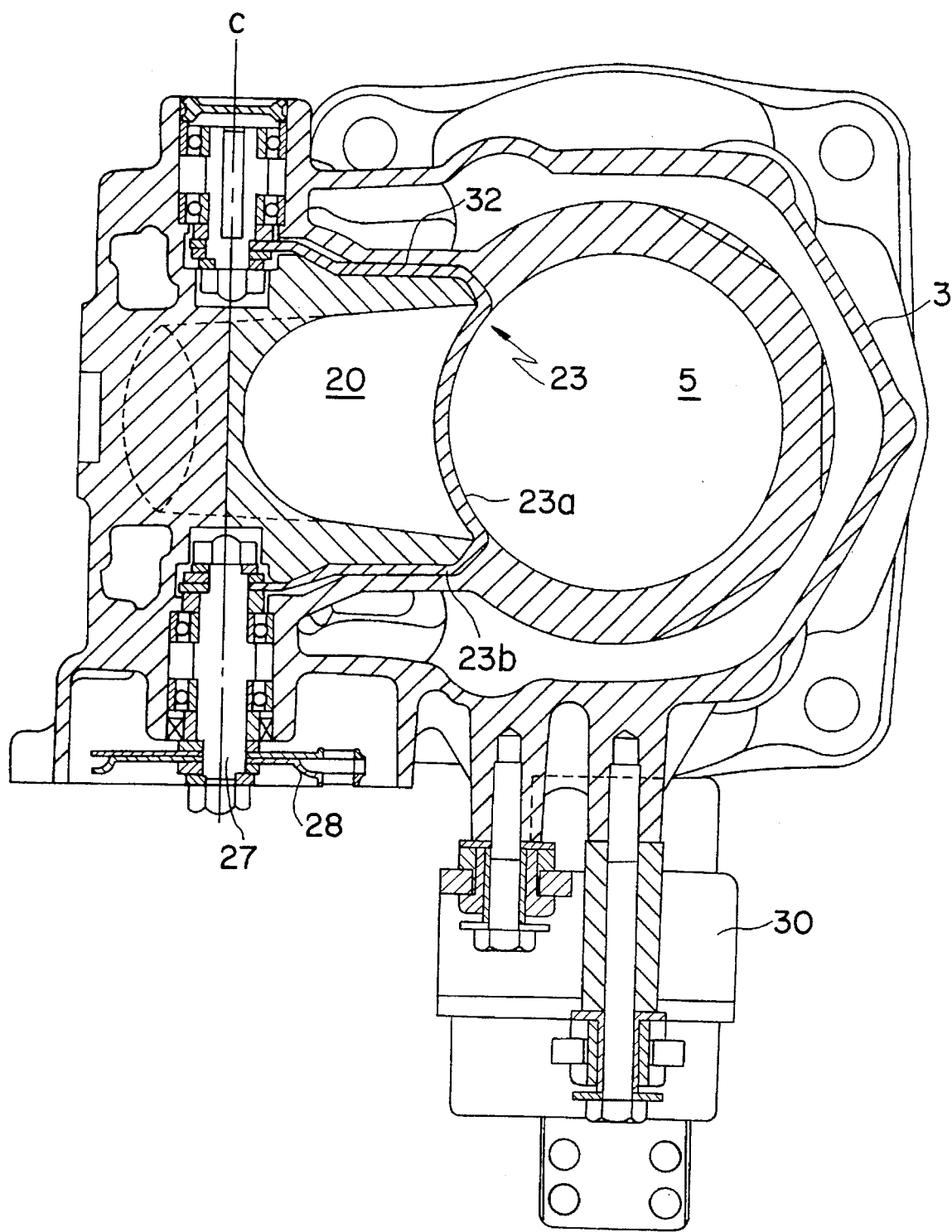
FIG. 3 is a horizontal sectional plan view taken along line III–III in FIG. 1.

Further, an exhaust control valve 23 serving as exhaust air passage opening ratio adjustment means is provided in the proximity of the exhaust port 18, and the exhaust control valve 23 is fitted in a gap 26, which is positioned between a recessed portion 24 provided on the cylinder block 3 and having an arcuate vertical section and an exhaust air passage member 25 formed with a cross section of substantially the same shape as that of the recessed portion 24 and has substantially the same gap width, and is supported for upward and downward rocking motion around a center line c. A drive lever 28, shown in FIG. 2, is integrally mounted on a drive shaft 27 integral with the exhaust control valve 23. The drive lever 28 is connected to a pulley 31 of an exhaust control servomotor 30 by way of a drive cable 29 so that the exhaust control valve 23 is driven to be rocked upwardly or downwardly by the exhaust control servomotor 30 so as to be set to a required exhaust opening ratio θe between 0 and 100%.

In addition, the exhaust control valve 23 is formed so as to have a channel-shaped horizontal cross section, and a side face arm portion 23b of the exhaust control valve 23 is fitted in a gap portion 32 positioned outwardly of the exhaust air passage 20 so that the side face arm portion 23b except an arcuate portion 23a of the exhaust control valve 23 for closing up the exhaust port 18 may not improperly affect a flow of exhaust gas.

Figure 4:
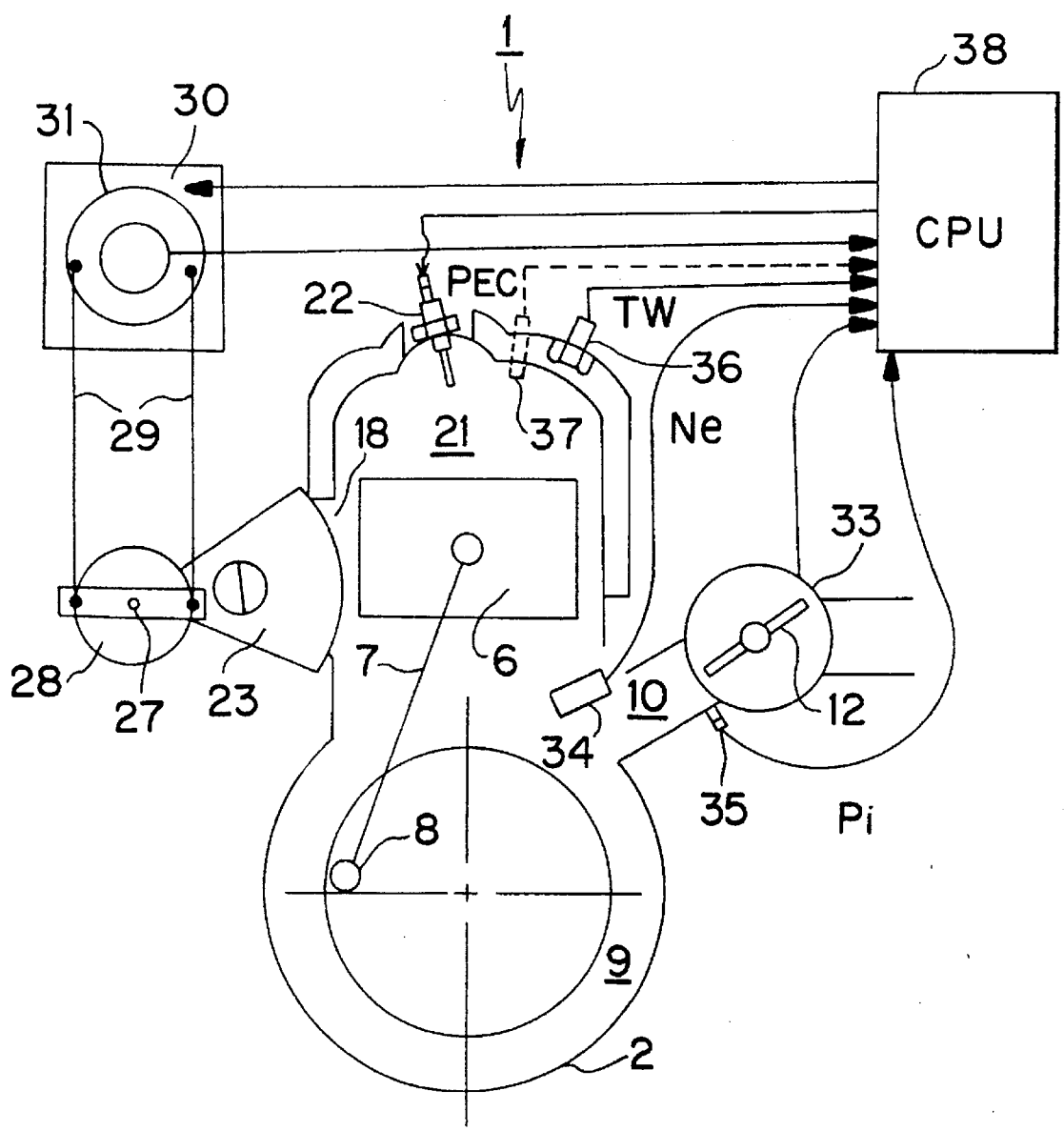
FIG. 4 is a schematic view showing an outline of the embodiment shown in FIG. 1.

FIG. 4 diagrammatically illustrates an essential part of the two-cycle engine 1 of the spark ignition type, the throttle valve opening 8th of the throttle valve 12, which is manually operated, is detected by a throttle valve opening sensor 33 formed from a potentiometer or a like element and is inputted to an exhaust control valve CPU 38.

Further, an engine speed Ne detected by an engine speed sensor 34, an intake air pressure Pi detected by an intake air pressure sensor 35, a cooling water temperature Tw detected by a water temperature gage 36, an indicator maximum pressure generation timing, an ignition timing or a compression starting pressure $P_{EC}$ detected by an indicator sensor 37, connection/disconnection of the clutch, a gear position of the transmission and so forth are inputted to the CPU 38.

The CPU 38 discriminates an operation condition of the two-cycle engine 1 of the spark ignition type from those input values and generates various control signals. In particular, the CPU 38 operates in accordance with a control graph of FIG. 5 which defines the exhaust opening ratio θe in accordance with the engine speed Ne and the throttle valve opening 8th, and transmits to the exhaust control servomotor 30 a drive signal Δθe at which the exhaust opening ratio θe based on the graph is provided.

Figure 5:
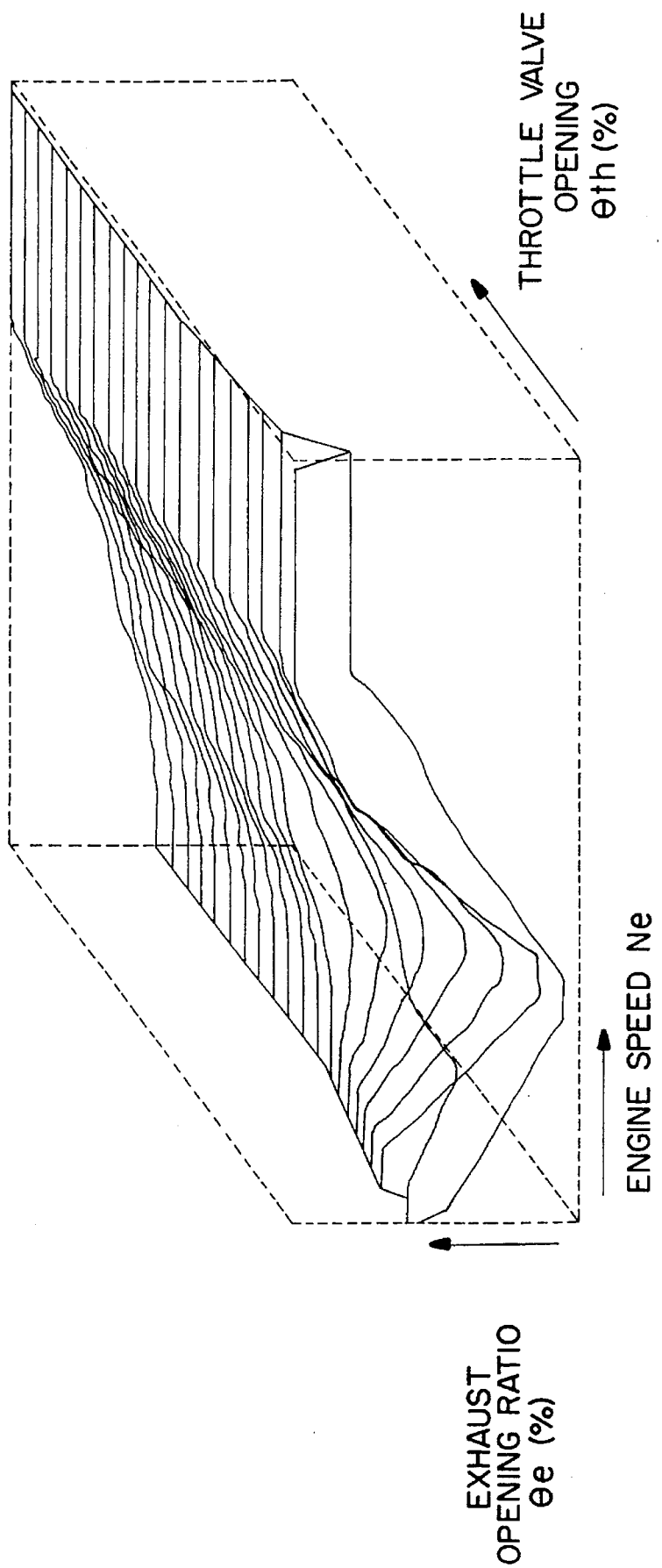
FIG. 5 is a graph showing a control map.

The exhaust air passage opening ratio θe in the graph of FIG. 5 provides a value at which gas filled in the cylinder can be ignited at an ignition timing most preferable for operation of the two-cycle engine 1 of the spark ignition type.

Figure 6:
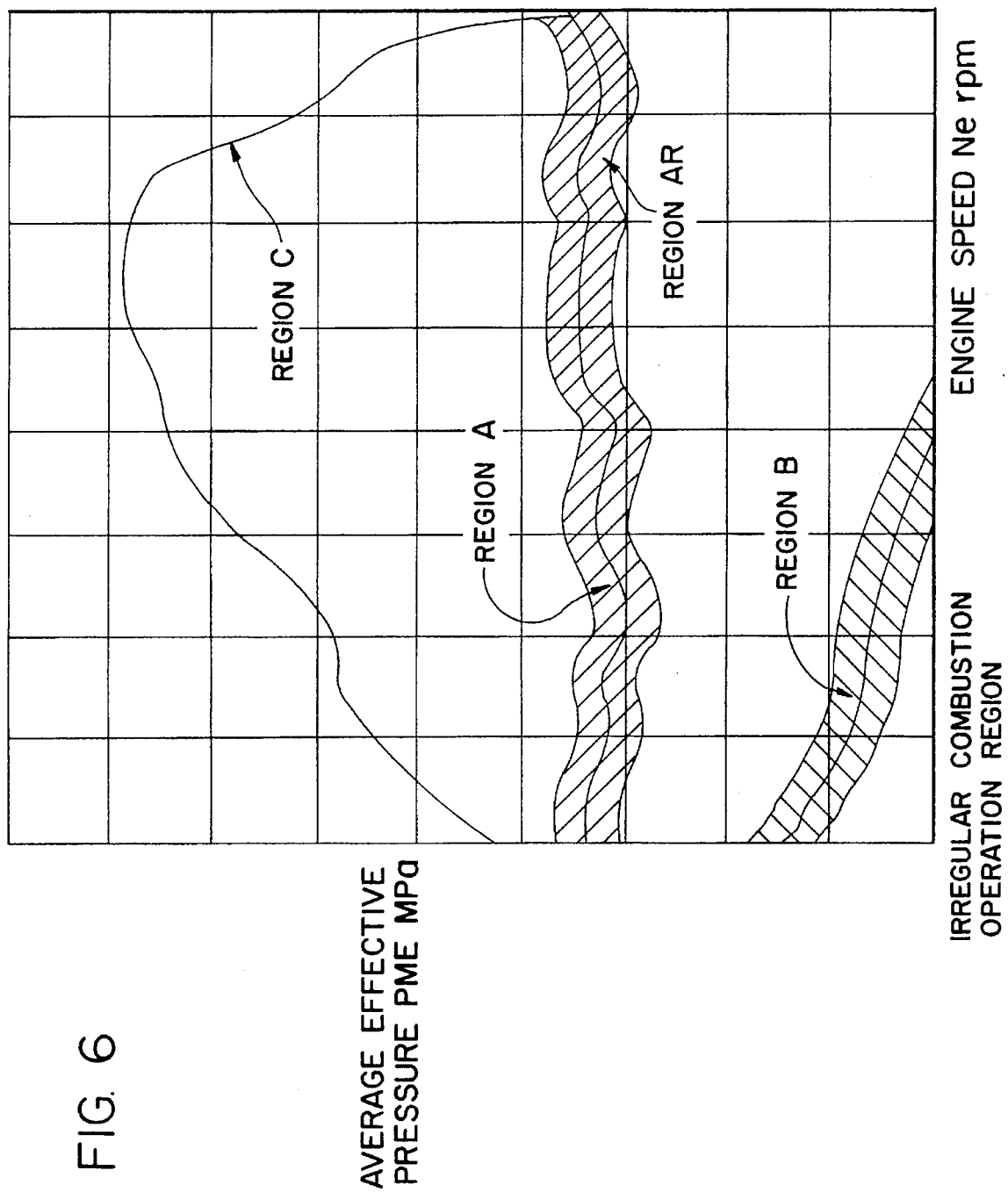
FIG. 6 is a characteristic diagram showing an operation condition of the engine with the engine speed indicated along the axis of the abscissa and with the average effective pressure indicated along the axis of the ordinate.

Further, the ignition plug 22 generates, in an ordinary combustion operation region, a spark, for example, at 10° (crank angle) prior to the top dead center, and when it is discriminated by the CPU 38 based on the graph shown in FIG. 6 from an engine speed Ne and an average effective pressure PME detected by the engine speed sensor 34 and the indicator sensor 37 that the engine 1 is operating in the transition operation region A between the ordinary combustion operation region and the AR combustion operation region, the ignition timing of the ignition plug 22 is advanced in response to a control signal of the CPU 38 so that a spark is generated at 20° prior to the top dead center.

Since the embodiment shown in FIGS. 1 to 4 is constructed in such a manner as described above, in an operation region in which the engine speed Ne is high, the exhaust control valve 23 is rocked upwardly to open the throttle opening to a substantially fully open condition so that the exhaust air passage opening ratio θe is set substantially to approximately 100%, and a spark is generated from the ignition plug 22 at 10° prior to the top dead center. Thus, the two-cycle engine 1 of the spark ignition type is operating in an ordinary combustion operation condition in which such spark ignition takes place.

Figure 8A:
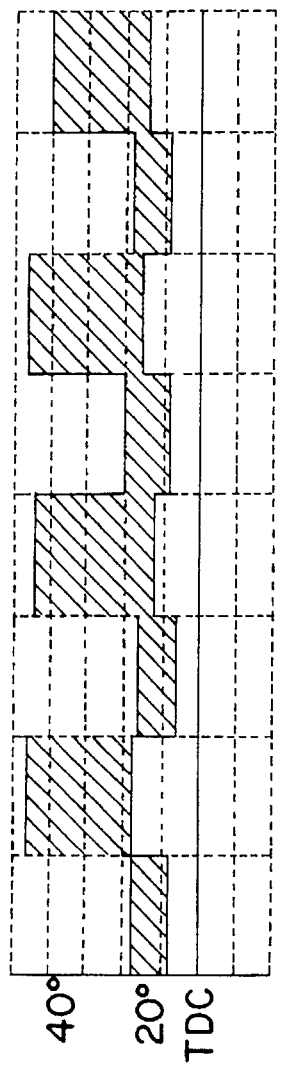
FIG. 8A is a characteristic diagram illustrating the condition according to the combustion timing of a conventional two-cycle engine of the spark ignition type.
Figure 8B:
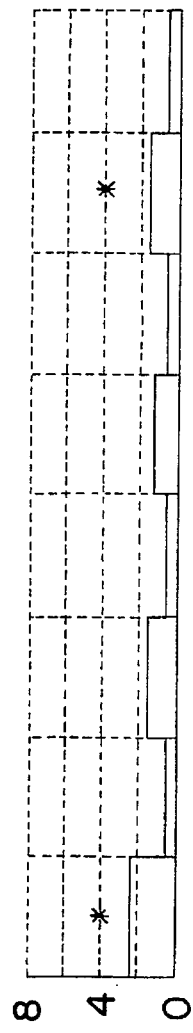
FIG. 8B is a characteristic diagram illustrating the in-cylinder pressure variation ratio of a conventional two-cycle engine of the spark ignition type.
Figure 8C:
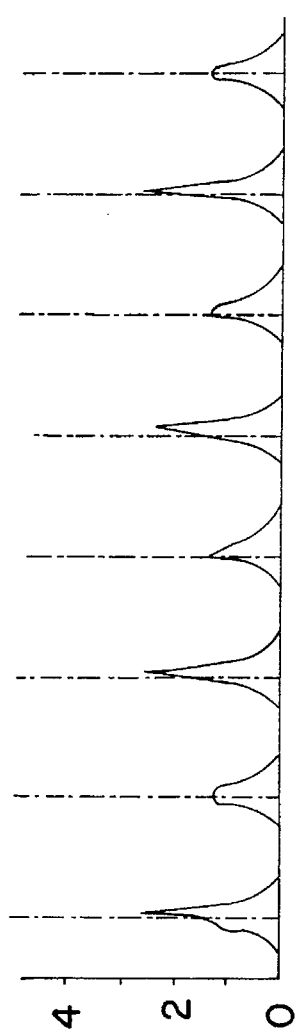
FIG. 8C is a characteristic diagram illustrating the in-cylinder pressure of a conventional two-cycle engine of the spark ignition type.

As the engine speed Ne decreases or as both the engine speed Ne and the throttle valve opening θth decrease, the exhaust control valve 23 is rocked downwardly so that the exhaust port 18 is restricted to reduce the exhaust air passage opening ratio θe, and when the transition operation region A between the ordinary combustion operation region and the AR combustion operation region is entered, the ignition timing of the ignition plug 22 comes to 20° prior to the top dead center. Thus, although the combustion timing varies to a great extent among different cycles as shown in FIG. 8A if the ignition timing of the ignition plug 22 otherwise remains at 10° prior to the top dead center, the combustion starting timing is substantially uniformed to the proximity of the top dead center as shown in FIG. 7A, and the pressure variation and the maximum pressure are decreased as shown in FIGS. 7B and 7C, resulting in a reduction in combustion noise and an elimination of harmful effects of heat by abnormal combustion. FIGS. 8B and 8C illustrate the pressure variation and the maximum pressure in a conventional two-cycle engine of the spark ignition type.

As the engine speed Ne further decreases, or as both the engine speed Ne and the throttle valve opening θth decrease, the exhaust control valve 23 is further rocked downwardly so that the exhaust port 18 is further restricted and the exhaust air passage opening ratio θe is further reduced. Consequently, a mixture in the combustion chamber 21 is compressed and self-ignited at an ignition timing most preferable for operation of the engine without being influenced remarkably by ignition of the ignition plug 22, and an AR combustion condition is entered.

Further, also in another transition operation region B between the AR combustion operation region and an irregular combustion operation region, since the ignition timing by the ignition plug 22 is advanced by 10° (crank angle) compared with the ignition timing in the ordinary combustion operation region, the irregular combustion condition is moderated, and the amount of unburnt hydrocarbons to be discharged is reduced.

While, in the embodiment described above, the exhaust control valve 23 is used as an exhaust air passage opening ratio adjustment means, a butterfly valve may be interposed for opening and closing movement in the exhaust air passage 20.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A two-cycle engine of the spark ignition type wherein a mixture obtained by mixing fuel with air in advance is supplied to a combustion chamber and the mixture in said combustion chamber is compressed and self-ignited at least in a low load operation condition by being activated by heat energy of burnt gas remaining in the combustion chamber by positively controlling an ignition time preferable for operation of the engine to effect activated heat atmosphere combustion comprising:

exhaust air passage opening ratio adjustment means for adjusting an opening ratio of an exhaust air passage to control a compression starting in-cylinder pressure;

ignition timing adjustment means for adjusting the ignition timing; and control means for driving said exhaust air passage opening adjustment means to an exhaust air passage opening ratio corresponding at least to an engine speed and a throttle valve opening to control the compression starting in-cylinder pressure to a predetermined compression starting in-cylinder pressure wherein the mixture in said combustion engine is compressed and self-ignited at an ignition timing in a preferred operation of said engine and for operating said ignition timing adjustment means in a predetermined transition operation region between the activated heat atmosphere combustion operation region and a predetermined ordinary spark ignition combustion operation region to cause spark ignition to occur at a timing earlier than a spark ignition timing in the predetermined ordinary spark ignition combustion operation region to control a combustion starting timing by the spark ignition to a timing in the proximity of the top dead center positioning of a piston operatively positioned within said combustion chamber.

2. The two-cycle engine of the spark ignition type according to claim 1, wherein the ignition timing for a preferred operation of the engine is approximately 10° prior to the top dead center.

3. The two-cycle engine of the spark ignition type according to claim 1, wherein the ignition timing for a preferred predetermined transition operation of the engine is approximately 20° prior to the top dead center.

4. The two-cycle engine of the spark ignition type according to claim 1, wherein said exhaust air passage opening ratio adjustment means includes an exhaust control valve disposed within a gap positioned in proximity to an exhaust port for said combustion chamber for selectively opening and closing said exhaust port.

5. The two-cycle engine of the spark ignition type according to claim 4, and further including a servomotor operatively connected to said control means for selectively imparting motion to said exhaust control valve for selectively setting an exhaust opening ratio between zero and one hundred percent.

6. The two-cycle engine of the spark ignition type according to claim 4, and further including a drive shaft and a drive lever operatively connected to said exhaust control valve for assisting in controlling the movement of said exhaust control valve.

7. The two-cycle engine of the spark ignition type according to claim 6, and further including a servomotor operatively connected to said control means and to said drive lever for rocking said exhaust control valve to set a required exhaust opening ratio between zero and one hundred percent.

8. The two-cycle engine of the spark ignition type according to claim 4, wherein said exhaust control valve further includes side face arm portions disposed within said gap portions and positioned outwardly of the exhaust air passage for closing said exhaust air passage without improperly affecting the flow of exhaust gas.

9. The two-cycle engine of the spark ignition type according to claim 1, wherein said exhaust air passage opening ratio adjustment means is a butterfly valve.

10. A two-cycle engine of the spark ignition type wherein a mixture of fresh air mixed with fuel is supplied to a combustion chamber and the mixture in said combustion chamber is compressed and self-ignited at least in a low load operation condition by being activated by heat energy of burnt gas remaining in the combustion chamber by positively controlling an ignition time preferable for operation of the engine to effect activated heat atmosphere combustion comprising:

exhaust air passage opening ratio adjustment means for adjusting an opening ratio of an exhaust air passage to control a compression starting in-cylinder pressure;

ignition timing adjustment means for adjusting the ignition timing; and control means for driving said exhaust air passage opening adjustment means to an exhaust air passage opening ratio corresponding at least to an engine speed and a throttle valve opening to control the compression starting in-cylinder pressure to a predetermined compression starting in-cylinder pressure wherein the mixture in said combustion engine is compressed and self-ignited at a first predetermined ignition timing in a preferred operation of said engine and for operating a second predetermined ignition timing in a predetermined transition operation region between the activated heat atmosphere combustion operation region and a predetermined ordinary spark ignition combustion operation region to cause spark ignition to occur at said second predetermined timing earlier than a spark ignition at said first predetermined ignition timing in the predetermined ordinary spark ignition combustion operation region for controlling a combustion starting timing by the spark ignition to a timing in the proximity of the top dead center positioning of a piston operatively positioned within said combustion chamber.

11. The two-cycle engine of the spark ignition type according to claim 10, wherein said first predetermined ignition timing for a preferred operation of the engine is approximately 10° prior to the top dead center.

12. The two-cycle engine of the spark ignition type according to claim 10, wherein said second predetermined ignition timing for a preferred predetermined transition operation of the engine is approximately 20° prior to the top dead center.

13. The two-cycle engine of the spark ignition type according to claim 10, wherein said exhaust air passage opening ratio adjustment means includes an exhaust control valve disposed within a gap positioned in proximity to an exhaust port for said combustion chamber for selectively opening and closing said exhaust port.

14. The two-cycle engine of the spark ignition type according to claim 13, and further including a servomotor operatively connected to said control means for selectively imparting motion to said exhaust control valve for selectively setting an exhaust opening ratio between zero and one hundred percent.

15. The two-cycle engine of the spark ignition type according to claim 13, and further including a drive shaft and a drive lever operatively connected to said exhaust control valve for assisting in controlling the movement of said exhaust control valve.

16. The two-cycle engine of the spark ignition type according to claim 15, and further including a servomotor operatively connected to said control means and to said drive lever for rocking said exhaust control valve to set a required exhaust opening ratio between zero and one hundred percent.

17. The two-cycle engine of the spark ignition type according to claim 15, wherein said exhaust control valve further includes side face arm portions disposed within said gap portions and positioned outwardly of the exhaust air passage for closing said exhaust air passage without improperly affecting the flow of exhaust gas.

18. The two-cycle engine of the spark ignition type according to claim 10, wherein said exhaust air passage opening ratio adjustment means is a butterfly valve.

* * * * *